US007411912B2

(12) United States Patent
Funnell (10) Patent No.: US 7,411,912 B2
(45) Date of Patent: Aug. 12, 2008

(54) METHOD AND APPARATUS FOR CONTROLLING TRAFFIC VOLUME MEASUREMENT VALIDITY IN A UNIVERSAL MOBILE TELECOMMUNICATIONS SYSTEM

(75) Inventor: Nicola Funnell, Coleshill (GB)

(73) Assignee: M-Stack Limited, Birmingham (GB)

( * ) Notice: Subject to any disclaimer, the term of this patent is extended or adjusted under 35 U.S.C. 154(b) by 596 days.

(21) Appl. No.: 10/931,263

(22) Filed: Aug. 31, 2004

(65) Prior Publication Data

US 2005/0157655 A1    Jul. 21, 2005

(30) Foreign Application Priority Data

Nov. 11, 2003   (MX)   .................. PA/A/2003/010314

(51) Int. Cl.
*H04L 12/26*   (2006.01)

(52) U.S. Cl. ..................................... 370/241; 455/67.11
(58) Field of Classification Search ................. 370/241; 455/423

See application file for complete search history.

(56) References Cited

OTHER PUBLICATIONS

ETSI TS 125 331 v.3.16.0, Sep. 2003, Technical Specification /3GPP TS 25.331 Version 3.16.0 Release 1999, Sec. 4.1, 8.4.0, 8.4.1, 8.4.1.1-8.4.1.3, 8.4.1.6.6, 8.4.1.6.7, 8.6.7, 8.6.7.1.*

* cited by examiner

*Primary Examiner*—Chi H. Pham
*Assistant Examiner*—Albert T Chou (57) ABSTRACT

The details of an apparatus and method are disclosed for ensuring that a traffic volume measurement message does not have a validity of CELL_DCH when the user equipment in a UMTS communications system is in CELL_FACH state. The validity is set to other than CELL_DCH at a UTRAN or the UE rejects a message having a validity of CELL_DCH when the UE is in CELL_FACH state.

11 Claims, 5 Drawing Sheets

METHOD AND APPARATUS FOR CONTROLLING TRAFFIC VOLUME MEASUREMENT VALIDITY IN A UNIVERSAL MOBILE TELECOMMUNICATIONS SYSTEM

CROSS REFERENCE TO RELATED APPLICATION

This application claims priority under 35 U.S.C. §119 to Mexican Patent Application No. PA/a/2003/010314, filed Nov. 11, 2003, the contents of which are incorporated herewith.

BACKGROUND

1. Technical Field

This application relates to UMTS (Universal Mobile Telecommunications System) in general, and to a method and apparatus for controlling traffic volume measurement validity in a universal mobile telecommunications system in particular.

2. Description of the Related Art

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.16.0, referred to herein as the 25.331 specification, addresses the subject of UMTS RRC (Radio Resource Control) protocol requirements between the UMTS Terrestrial Radio Access Network (UTRAN) and the UE.

Section 8.4 of the 25.331 specification provides that a UTRAN may control a measurement in the UE, by broadcast of SYSTEM INFORMATION and/or by transmitting a MEASUREMENT CONTROL message to the UE. The purpose of the measurement control procedure is to set up, modify or release a measurement in the UE.

A MEASUREMENT CONTROL message includes a measurement identity, a measurement command, for example, Setup, Modify or Release and a measurement type, specifying what the UE should measure. It may also include a variety of other control information depending on the measurement type. One of the possible measurement types is traffic volume measurement (TVM), which comprises measurements of uplink traffic volume. Control information for TVM includes measurement validity, which defines the UE states in which the measurement is valid.

The inventor has found that there is an inconsistency in the 25.331 specification relating to the validity of traffic volume measurements. As explained above, a traffic volume measurement is set up by the UTRAN sending a MEASUREMENT CONTROL message to the UE. This may include the optional information element (IE) 'measurement validity' and the IE 'UE state', which specifies the state in which the UE must be for the Traffic Volume Measurement to be valid. The 'UE state' may be one of 'Cell_DCH', 'all states' or 'all states except Cell_DCH'

Traffic volume measurements are addressed at sections 8.4.1.3 and 8.4.1.6.6 of the 25.331 specification.

The relevant extract from section 8.4.1.3 specifies that:

"1> if the UE in CELL_FACH state receives a MEASUREMENT CONTROL message, which indicates the same measurement identity as that stored in the variable MEASUREMENT_IDENTITY:
2> update the stored information with the traffic volume measurement control information in variable MEASUREMENT_IDENTITY; and
2> refrain from updating the traffic volume measurement control information associated with this measurement identity in the variable MEASUREMENT_IDENTITY with the information received in System Information Block type 12 (or System Information Block type 11, according to subclause 8.1.1.6.11) until this measurement is explicitly released with another MEASUREMENT CONTROL message."

The relevant extract from section 8.4.1.6.6 specifies that:

Upon transition from CELL_DCH to CELL_FACH or CELL_PCH or URA_PCH state, the UE shall:
1> retrieve each set of measurement control information of measurement type "traffic volume" stored in the variable MEASUREMENT_IDENTITY; and
2> if the optional IE "measurement validity" for this measurement has not been included:
3> delete the measurement associated with the variable MEASUREMENT_IDENTITY.
2> if the IE "measurement validity" for the measurement has been included, and the IE "UE state" has been assign to value "CELL_DCH":
3> stop measurement reporting;
3> store the measurement associated with the variable MEASUREMENT_IDENTITY to be used after the next transition to CELL_DCH state.
2> if the IE "measurement validity" for the measurement has been included, and the IE "UE state" has been assign to value "all states":
3> continue measurement reporting.
2> if the IE "measurement validity" has been included and the IE "UE state" has been assigned to value "all s except CELL_DCH":
3> resume this measurement and associated reporting.
1> if no traffic volume type measurement has been assigned to the UE with a MEASUREMENT CONTROL message that is valid in CELL_FACH or CELL_PCH or URA_PCH states (stored in the variable MEASUREMENT_IDENTITY), which has the same identity as the one indicated in the IE "Traffic volume measurement system information":
2> store the measurement control information from the IE "Traffic volume measurement system information" received in System Information Block type 12 (or System Information Block type 11, according to subclause 8.1.1.6.11) in the variable MEASUREMENT_IDENTITY;
2> begin traffic volume measurement reporting according to the assigned information."

Consider the scenario where the UE is in the Cell_FACH state and receives a MEASUREMENT CONTROL message to set up a traffic volume measurement with a validity of Cell_DCH. This means that the measurement will be stored in the variable MEASUREMENT_IDENTITY, so that the measurement can be set up when the UE moves to the Cell_DCH state. It should be noted that, according to section 8.4.1.3, the UE should not delete or overwrite this information unless the measurement has been explicitly released by another MEASUREMENT CONTROL message.

Now consider that the UE moves to Cell_DCH. The traffic volume measurement is then valid and so the measurements are made.

Now consider that the UE moves back to Cell_FACH. According to section 8.4.1.6.6, the measurement should be stopped, but the information retained in MEASUREMENT_IDENTITY for use on the next transition to Cell_DCH.

However, section 8.4.1.6.6 also states that if there is no measurement valid in Cell_FACH, then the one specified in System Information Block type 11 or 12 (SIB11 or SIB12) should be used.

If the TVM in SIB11/12 has the same identity as the TVM saved in MEASUREMENT_IDENTITY, that measurement would need to be updated, but this contradicts section 8.4.1.3 which states that this cannot be done until this measurement is explicitly released.

SUMMARY

It is an object of the present application that an apparatus and method according to the invention may enable a UE to exhibit unambiguous behaviour in response to the receipt of a traffic volume measurement message from a UTRAN in a UMTS communications system.

According to a first aspect of the present invention, there is provided a method of setting up a traffic volume measurement to be performed by a user equipment in a UMTS communications system, in which the user equipment is capable of transitioning between a plurality of states including a CELL_FACH state and a CELL_DCH state, and the traffic volume measurement is associated with a validity element which has a value that defines the states in which the measurement is valid, the method comprising the step of setting the validity element for the traffic volume measurement to prevent the validity element from taking the value 'CELL_DCH' when the user equipment is in the CELL_FACH state.

The method may comprise setting the validity element to the value 'all states' or to the value 'all states except CELL_DCH'.

The method may alternatively comprise omitting the validity element.

The traffic volume measurement may further be associated with a first measurement identity, and a further traffic volume measurement having a second measurement identity may be stored in an element block referred to as System Information Block type 11 or 12, and the method may comprise preventing the validity element from taking the value 'CELL_DCH' when the user equipment is in the CELL_FACH state and the first and second measurement identities are the same.

According to a second aspect of the invention, there is provided a UTRAN for transmitting a message to a user equipment in a UMTS communications system for setting up a traffic volume measurement to be performed by the user equipment, the user equipment being capable of transitioning between a plurality of states including a CELL_FACH state and a CELL_DCH state, and the traffic volume measurement being associated with a validity element which has a value that defines the states in which the measurement is valid, the UTRAN including a control module for setting the validity element for the traffic volume measurement to prevent the validity element from taking the value 'CELL_DCH' when the user equipment is in the CELL_FACH state.

The control module may be configured to set the validity element to the value 'all states' or 'all states except CELL_DCH'.

The traffic volume measurement may further be associated with a first measurement identity, and a further traffic volume measurement having a second measurement identity may be stored in an element block referred to as System Information Block type 11 or 12, and the control module may be configured to prevent the validity element from taking the value 'CELL_DCH' when the user equipment is in the CELL_FACH state and the first and second measurement identities are the same.

According to a third aspect of the invention, there is provided a method of processing a traffic volume measurement control message at a user equipment in a UMTS communications system, in which the user equipment is capable of transitioning between a plurality of states including a CELL_FACH state and a CELL_DCH state, and the traffic volume measurement is associated with a validity element which has a value that defines the states in which the measurement is valid, the method comprising the steps of receiving the traffic volume measurement control message from a UTRAN, determining the value of the validity element associated with the traffic volume measurement when the user equipment is in the CELL_FACH state and in the event that the value is 'CELL_DCH', rejecting the traffic volume measurement control message.

The step of rejecting the traffic volume measurement control message may comprise transmitting a response to the UTRAN having the error value CONFIGURATION_INCOMPLETE.

The traffic volume measurement may further be associated with a first measurement identity, and a further traffic volume measurement having a second measurement identity may be stored in an element block referred to as System Information Block type 11 or 12, and the method may comprise rejecting the traffic volume measurement control message when the value is 'CELL_DCH' and the first and second measurement identities are the same.

According to a fourth aspect of the invention, there is provided user equipment for processing a traffic volume measurement control message in a UMTS communications system, in which the user equipment is capable of transitioning between a plurality of states including a CELL_FACH state and a CELL_DCH state, and the traffic volume measurement is associated with a validity element which has a value that defines the states in which the measurement is valid, the equipment including a control module for determining the value of the validity element associated with the traffic volume measurement when the user equipment is in the CELL_FACH state and in the event that the value is 'CELL_DCH', the control module being configured to reject the traffic volume measurement control message.

The traffic volume measurement may further be associated with a first measurement identity, and a further traffic volume measurement having a second measurement identity may be stored in an element block referred to as System Information Block type 11 or 12, and the control module may be configured to reject the traffic volume measurement control message when the value is 'CELL_DCH' and the first and second measurement identities are the same.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

Figure 1:
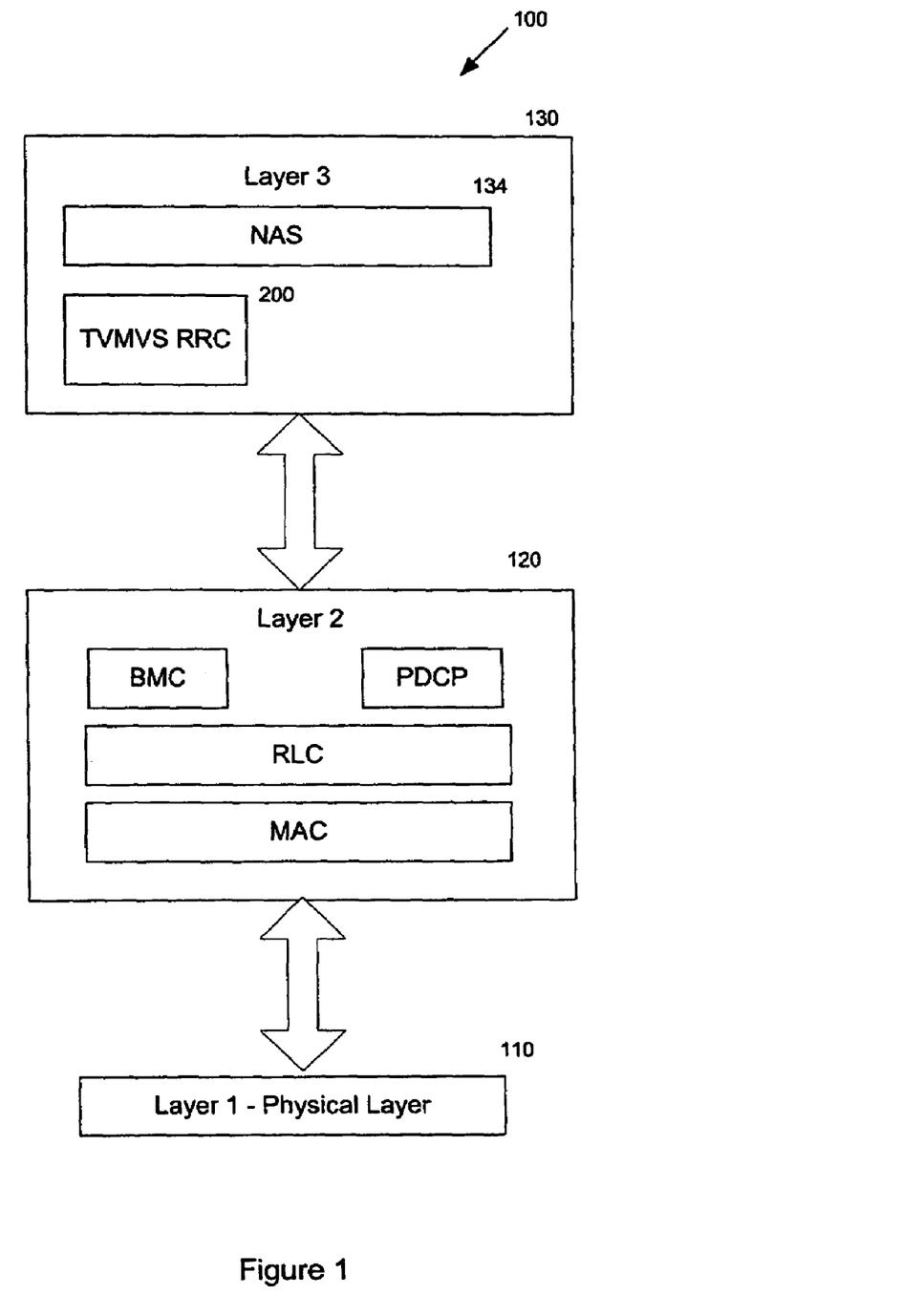
FIG. 1 is a block diagram illustrating an embodiment of a protocol stack apparatus provided with a TVM validity setting Radio Resource Control module (TVMVS RRC), in accordance with the present invention.

Referring to the drawings, FIG. 1 is a block diagram illustrating an embodiment of a protocol stack apparatus provided with a TVM validity setting Radio Resource Control module (TVMVS RRC), in accordance with the present invention.

The TVMVS RRC module 200 is a sub layer of Layer 3 130 of a UMTS protocol stack 100. The TVMVS RRC 200 exists in the control plane only and provides an information transfer service to the non-access stratum NAS 134. The TVMVS RRC 200 is responsible for controlling the configuration of interface Layer 1 110 and Layer 2 120.

At the UTRAN, the TVMVS RRC 200 layer ensures that a TVM set up in the Cell_FACH state does not have a validity of CELL_DCH. Instead it has a validity of 'all states' or 'all states except CELL_DCH'. This means that all TVM messages received by a UE in the Cell_FACH state would always be valid in the CELL_FACH state, so that the SIB11/12 TVM information specified in section 8.4.1.3 would never be required.

Alternatively, the TVMVS RRC 200 layer of the UE decodes a TVM message from the UTRAN and checks whether a validity of Cell_DCH has been specified for a UE in the Cell_FACH state. If so, the measurement control message is rejected, as set out in detail below.

Advantageously, the TVMVS RRC module 200 allows the protocol stack 100 to behave unambiguously on receipt of a MEASUREMENT CONTROL message from the UTRAN.

Figure 2:
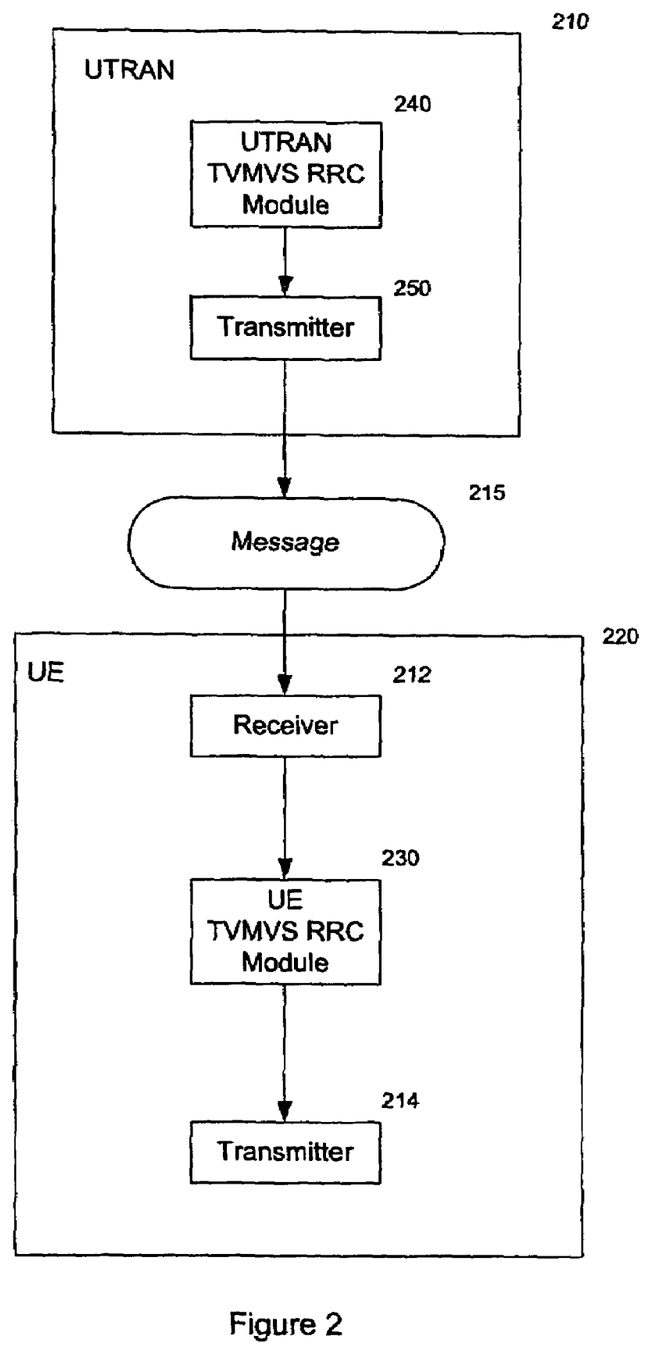
FIG. 2 is a block diagram illustrating the TVMVS RRC 200 module of FIG. 1 in the context of a UE and UTRAN.
Figure 3A:
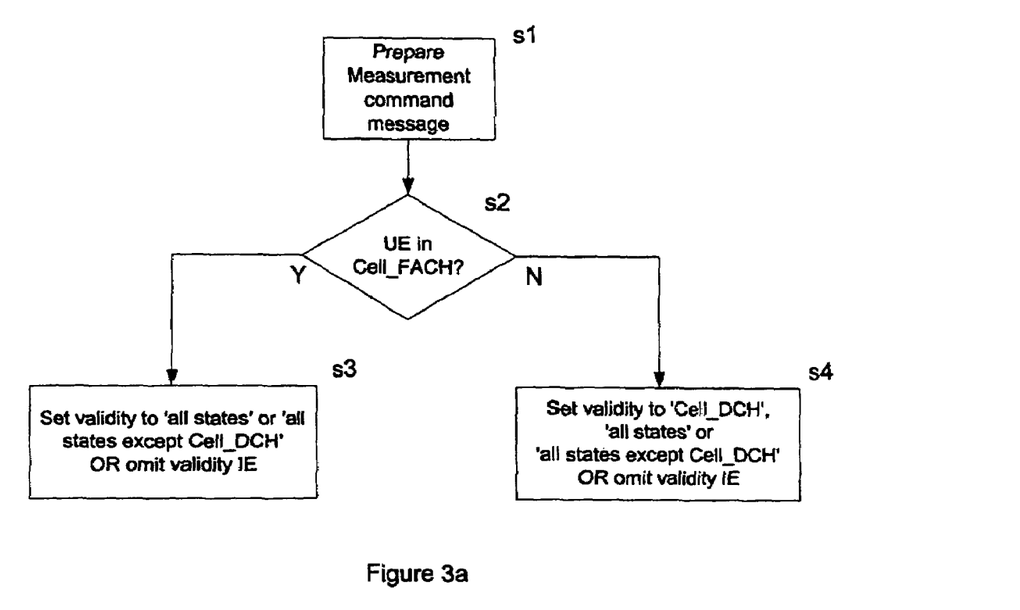
FIG. 3a is a flow diagram illustrating the processing carried out by the UTRAN TVMVS RRC module to ensure that a correct TVM validity is specified for a UE in Cell_FACH state.

FIG. 2 is a block diagram illustrating the TVMVS RRC 200 module of FIG. 1 in the context of a UE and UTRAN, while FIG. 3a is a flow diagram illustrating the processing carried out by the UTRAN TVMVS RRC module to ensure that a correct TVM validity is specified for a UE in Cell_FACH state.

The UTRAN 210 includes a UTRAN TVMVS RRC module 240. When a MEASUREMENT CONTROL message 215 is being prepared for transmission to the UE (step s1), the UTRAN TVMVS RRC module 240 determines whether the UE is in Cell_FACH state (step s2). If the UE is in Cell_FACH state, it sets the 'measurement validityUE state' IE to be one of 'all states' or 'all states except Cell_DCH' (step s3). If the UE is in Cell_FACH state, the UTRAN TVMVS RRC module 240 sets the validity to be any one of 'Cell_DCH', 'all states' or 'all states except Cell_DCH' (step s4). Another option which can occur in either one of steps s3 or s4 is for the UTRAN TVMVS RRC module 240 to omit the optional 'measurement validity' IE entirely. This has the effect of the validity being set to the current state, so is an acceptable option in either case. As a result of this procedure, the UTRAN TVMVS RRC module 240 ensures that the validity cannot be set to 'Cell_DCH' when the UE is in the 'Cell_FACH' state.

It will be understood by the skilled person that the term 'validity' used in this specification, also used interchangeably with the terms 'TVM validity' and 'validity element', is used to refer to the UE states in which a traffic volume measurement is valid and may also be used to refer to one or both of the IEs 'measurement validity' and 'UE state'.

Figure 3B:
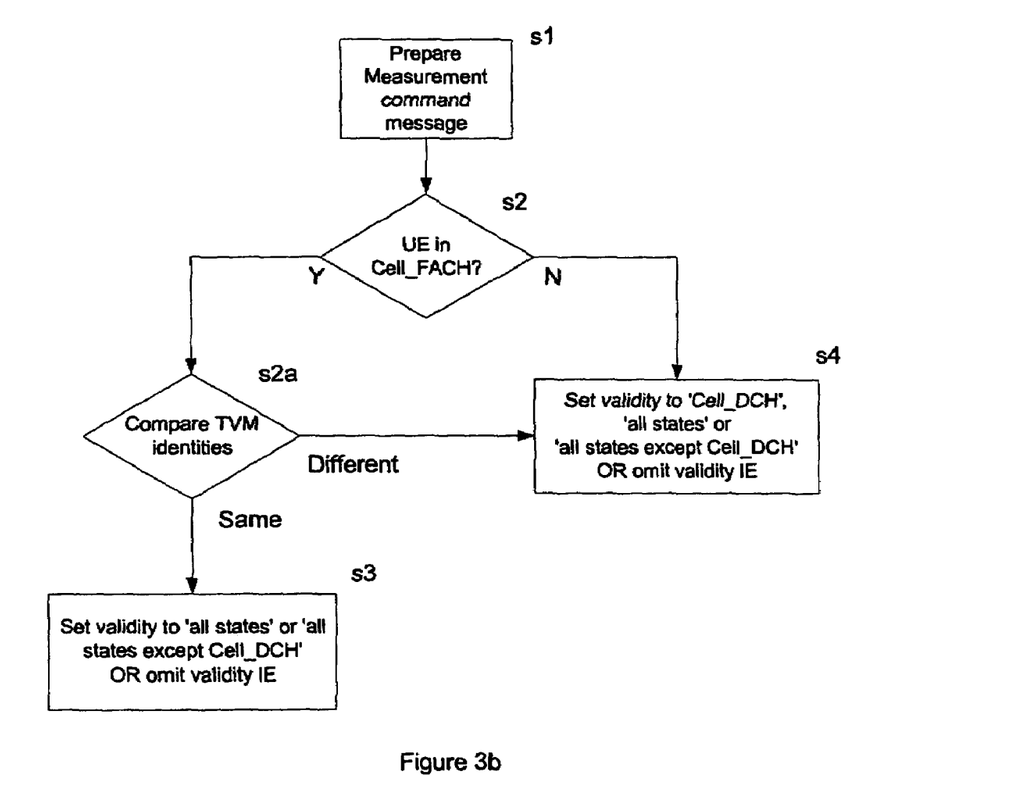
FIG. 3b is a flow diagram illustrating an alternative method of ensuring that the TVM validity cannot be set to 'Cell_DCH' when the UE is in the 'Cell_FACH' state.

FIG. 3b is a flow diagram illustrating an alternative method of ensuring that the TVM validity cannot be set to 'Cell_DCH' when the UE is in the 'Cell_FACH' state. Steps s1, s2, s3 and s4 are the same as those illustrated in FIG. 3a and the corresponding description above also applies to this embodiment. However, if the UE is determined to be in the 'Cell_FACH' state at step s2, the UTRAN TVMVS RRC module 240 then additionally determines whether the TVM measurement identity held in the variable MEASUREMENT_IDENTITY is the same as the TVM identity in the System Information Blocks SIB11/12 (step s2a). If it is different, then the validity may be set to 'Cell_DCH' (step s4). If it is the same, then the validity is prevented from being set to 'Cell_DCH' (s3).

Figure 4A:
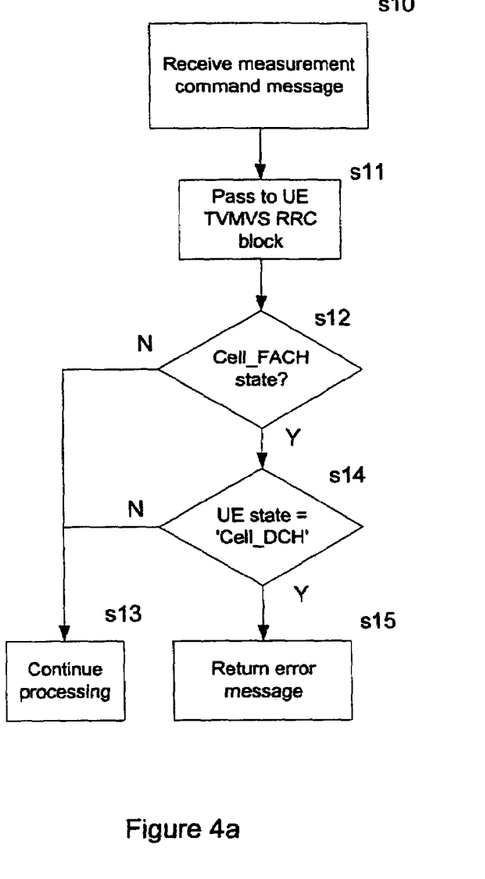
FIG. 4a is a flow diagram illustrating the processing carried out by the UE TVMVS RRC module to ensure that a correct TVM validity is specified for a UE in Cell_FACH state.

The invention may also be implemented at the UE, where the UTRAN behaviour specified above has not been enforced. FIG. 4a is a flow diagram illustrating the processing carried out by the UE TVMVS RRC module to ensure that a correct TVM validity is specified for a UE in Cell_FACH state. The UTRAN 210 sends a MEASUREMENT CONTROL message 215 that is received by a receiver 212 in the UE 220 (step s10). The message is passed to the UE TVMVS RRC block 230 for processing (step s10). The UE TVMVS RRC module 230 first determines whether the UE is in the Cell_FACH state (step s12). If not, processing of the message continues in accordance with the procedures set out in the 25.331 specification (step s13). If the UE is in the Cell_FACH state, the UE TVMVS RRC module 230 determines whether the IE 'UE state' has been assigned the value 'Cell_DCH' (step s14). If so, the UE TVMVS RRC module 230 returns a MEASUREMENT CONTROL FAILURE message to the UTRAN with an error cause of CONFIGURATION_INCOMPLETE (step s15). Otherwise, processing of the measurement command message continues in accordance with the procedures set out in the 25.331 specification (step s13).

Figure 4B:
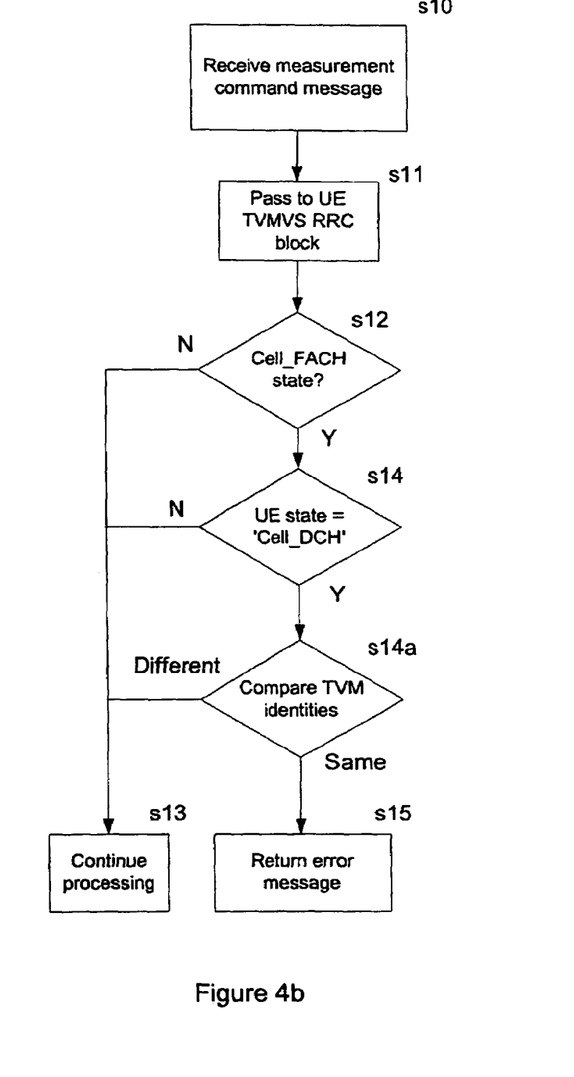
FIG. 4b is a flow diagram illustrating an alternative method of ensuring that a correct TVM validity is specified for a UE in Cell_FACH state.

FIG. 4b is a flow diagram illustrating an alternative method of ensuring that a correct TVM validity is specified for a UE in Cell_FACH state. Steps s10, s11, s12, s13, s14 and s15 are the same as those illustrated in FIG. 4a and the corresponding description above also applies to this embodiment. However, if the validity is determined to be 'Cell_DCH' at step s14, the UE TVMVS RRC module 240 then additionally determines whether the TVM measurement identity held in the variable MEASUREMENT_IDENTITY is the same as the TVM identity in SIB11/12 (step s14a). If it is not, then processing can continue (step s13). However, if it is the same, an error message is returned (step s15).

Figure 5:
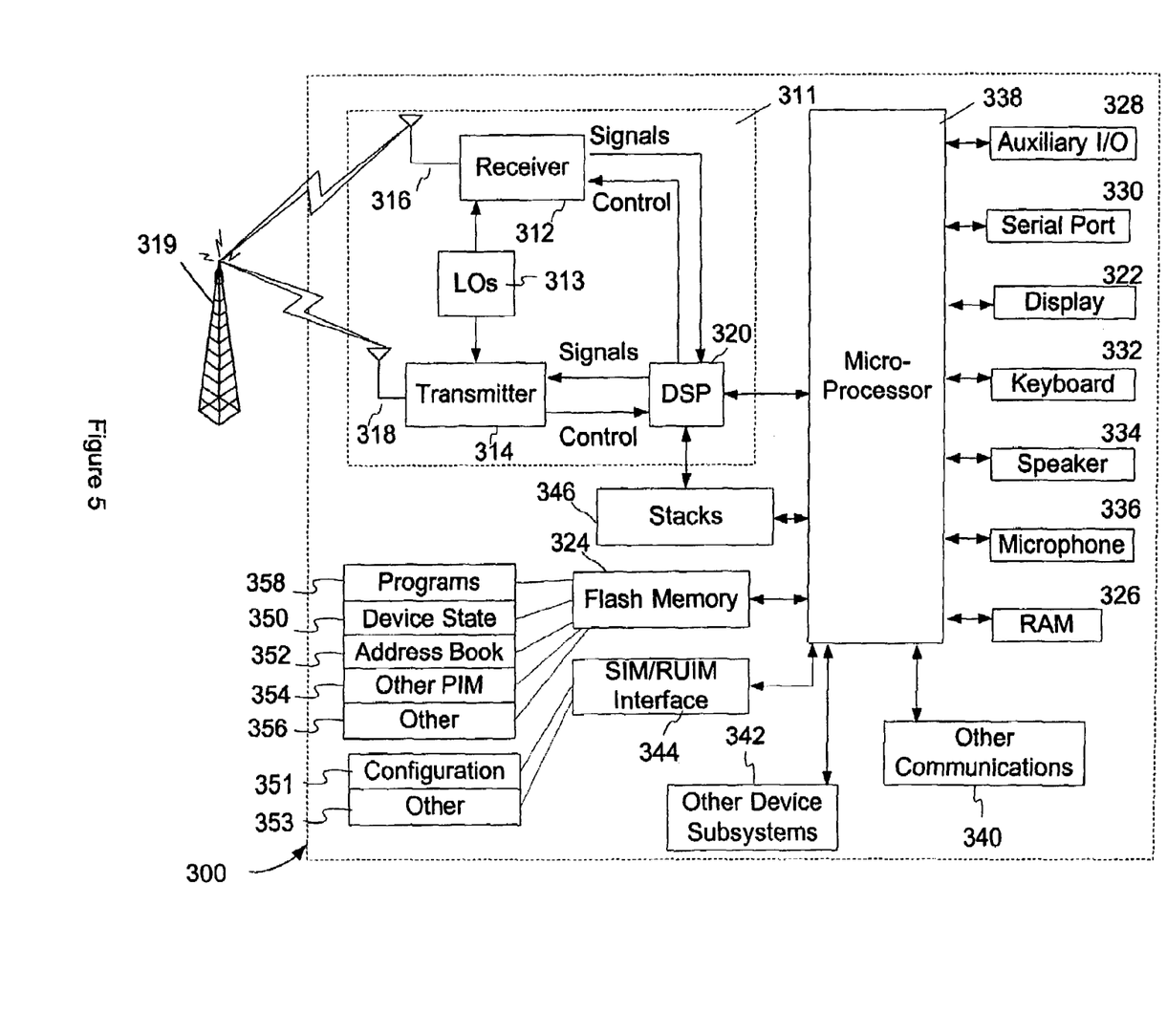
FIG. 5 is a block diagram illustrating a mobile device, which can act as a UE and co-operate with the apparatus and methods of FIGS. 1 to 4.

Turning now to FIG. 5, FIG. 5 is a block diagram illustrating a mobile device, which can act as a UE and co-operate with the apparatus and methods of FIGS. 1 to 4, and which is an exemplary wireless communication device. Mobile station 300 is preferably a two-way wireless communication device having at least voice and data communication capabilities. Mobile station 300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 300 is enabled for two-way communication, it will incorporate a communication subsystem 311, including both a receiver 312 and a transmitter 314, as well as associated components such as one or more, preferably embedded or internal, antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate. For example, mobile station 300 may include a communication subsystem 311 designed to operate within the Mobitex™ mobile communication system, the DataTAC™ mobile communication system, a GPRS network, a UMTS network, or an EDGE network.

Network access requirements will also vary depending upon the type of network 319. For example, in the Mobitex and DataTAC networks, mobile station 300 is registered on the network using a unique identification number associated with each mobile station. In UMTS and GPRS networks, however, network access is associated with a subscriber or user of mobile station 300. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 300 will be unable to carry out any other functions involving communications over the network 300. The SIM interface 344 is normally similar to a card-slot into which a SIM card can be inserted and ejected like a diskette or PCMCIA card. The SIM card can have approximately 64K of memory and hold many key configuration 351, and other information 353 such as identification, and subscriber related information.

When required network registration or activation procedures have been completed, mobile station 300 may send and receive communication signals over the network 319. Signals received by antenna 316 through communication network 319 are input to receiver 312, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Mobile station 300 preferably includes a microprocessor 338 which controls the overall operation of the device. Communication functions, including at least data and voice communications, are performed through communication subsystem 311. Microprocessor 338 also interacts with further device subsystems such as the display 322, flash memory 324, random access memory (RAM) 326, auxiliary input/output (I/O) subsystems 328, serial port 330, keyboard 332, speaker 334, microphone 336, a short-range communications subsystem 340 and any other device subsystems generally designated as 342.

Some of the subsystems shown in FIG. 5 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the microprocessor 338 is preferably stored in a persistent store such as flash memory 324, which may instead be a read-only memory (ROM) or similar storage element (not shown). Those skilled in the art will appreciate that the operating system, specific device applications, or parts thereof, may be temporarily loaded into a volatile memory such as RAM 326. Received communication signals may also be stored in RAM 326.

As shown, flash memory 324 can be segregated into different areas for both computer programs 358 and program data storage 350, 352, 354 and 356. These different storage types indicate that each program can allocate a portion of flash memory 324 for their own data storage requirements. Microprocessor 338, in addition to its operating system functions, preferably enables execution of software applications on the mobile station. A predetermined set of applications that control basic operations, including at least data and voice communication applications for example, will normally be installed on mobile station 300 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 319. In a preferred embodiment, the PIM data items are seamlessly integrated, synchronized and updated, via the wireless network 319, with the mobile station user's corresponding data items stored or associated with a host computer system. Further applications may also be loaded onto the mobile station 300 through the network 319, an auxiliary I/O subsystem 328, serial port 330, short-range communications subsystem 340 or any other suitable subsystem 342, and installed by a user in the RAM 326 or preferably a non-volatile store (not shown) for execution by the microprocessor 338. Such flexibility in application installation increases the functionality of the device and may provide enhanced on-device functions, communication-related functions, or both. For example, secure communication applications may enable electronic commerce functions and other such financial transactions to be performed using the mobile station 300.

In a data communication mode, a received signal such as a text message or web page download will be processed by the communication subsystem 311 and input to the microprocessor 338, which preferably further processes the received signal for output to the display 322, or alternatively to an auxiliary I/O device 328. A user of mobile station 300 may also compose data items such as email messages for example, using the keyboard 332, which is preferably a complete alphanumeric keyboard or telephone-type keypad, in conjunction with the display 322 and possibly an auxiliary I/O device 328. Such composed items may then be transmitted over a communication network through the communication subsystem 311.

For voice communications, overall operation of mobile station 300 is similar, except that received signals would preferably be output to a speaker 334 and signals for transmission would be generated by a microphone 336. Alternative voice or audio I/O subsystems, such as a voice message recording subsystem, may also be implemented on mobile station 300. Although voice or audio signal output is preferably accomplished primarily through the speaker 334, display 322 may also be used to provide an indication of the identity of a calling party, the duration of a voice call, or other voice call related information for example.

Serial port 330 in FIG. 5, would normally be implemented in a personal digital assistant (PDA)-type mobile station for which synchronization with a user's desktop computer (not shown) may be desirable, but is an optional device component. Such a port 330 would enable a user to set preferences through an external device or software application and would extend the capabilities of mobile station 300 by providing for information or software downloads to mobile station 300 other than through a wireless communication network. The alternate download path may for example be used to load an encryption key onto the device through a direct and thus reliable and trusted connection to thereby enable secure device communication.

Other communications subsystems 340, such as a short-range communications subsystem, is a further optional component which may provide for communication between mobile station 300 and different systems or devices, which need not necessarily be similar devices. For example, the subsystem 340 may include an infrared device and associated circuits and components or a Bluetooth™ communication module to provide for communication with similarly enabled systems and devices.

When mobile device 300 is used as a UE, protocol stacks 346 include a method and apparatus for controlling traffic volume measurement validity in a universal mobile telecommunications system.

The above-described embodiments of the present application are intended to be examples only. Those of skill in the art may effect alterations, modifications and variations to the particular embodiments without departing from the scope of the application as defined by the appended claims.

I claim:

1. A method for preparing a traffic volume measurement (TVM) message for transmission by a terrestrial radio access network (TRAN), the TRAN compliant for use as a Universal Terrestrial Radio Access Network (UTRAN) and compliant for use in a Universal Mobile Telecommunications System (UMTS), comprising cells configurable to transmit messages, the method comprising:
    preparing a TVM message configured to be receivable by a user equipment (UE) based on information in the TRAN;
    determining if a state associated with the UE information is the CELL_FACH state;
    setting, if the associated state is CELL_FACH, a validity element to a value that is one of "all states" or "all states except CELL_DCH", the validity element configurable for inclusion in the TVM message; and
    transmitting the prepared TVM message.

2. The method of claim 1, comprising transmitting the prepared TVM message with no validity element.

3. The method of claim 1, wherein the TVM is further associated with a first measurement identity, and a second TVM having a second measurement identity is stored in an element block referred to as System Information Block type 11 or 12, the method comprising setting, if the first and second measurement identities are the same, the validity element to a value that is one of "all states" or "all states except CELL_DCH".

4. A terrestrial radio access network (TRAN), the TRAN compliant for use as a Universal Terrestrial Radio Access Network (UTRAN) and compliant for use in a Universal Mobile Telecommunications System (UMTS) comprising:
    cells configurable to transmit messages;
    a traffic volume measurement validity setting radio resource control module (TVMVS RCC module) configured to prepare at least portions a TVM message, the message configurable to be receivable by a UE based on information in the TRAN;
    the TVMVS RCC module also configured to detect a state associable with the UE information, and further configured to set a validity element to a value that is one of "all states" or "all states except CELL_DCH" if the detected state is CELL_FACH, the validity element configurable for inclusion in the prepared TVM message; and
    a transmitter configured to transmit, using a cell, the message at least partially prepared by the TVMVS RCC module.

5. The TRAN of claim 4, wherein the TVMVS RCC module is further configured to prepare the TVM message such that the validity element is not transmitted.

6. The TRAN of claim 4, wherein the TVM is further associated with a first measurement identity, and a second TVM having a second measurement identity is stored in an element block referred to as System Information Block type 11 or 12, the control module being configured to set, if the first and second measurement identities are the same, the validity element to a value that is one of "all states" or "all states except CELL_DCH".

7. A method of processing a traffic volume measurement (TVM) control message at a user equipment (UE), the UE compliant for use in a Universal Mobile Telecommunications System (UMTS) in which the UE provides for transition between a plurality of states including a CELL_FACH state and a CELL_DCH state, and where the TVM is associable with a validity element which has a value that defines the states in which the measurement is valid, the method comprising:
    receiving the TVM control message;
    detecting if there is a validity element associable with the TVM;
    determining the value of the validity element associable with the TVM, if there is one; and
    if the UE is in CELL_FACH state and if the determined value is CELL_DCH rejecting the TVM control message.

8. The method of claim 7, wherein rejecting the TVM control message comprises
    transmitting a message, the message comprising the error value CONFIGURATION_INCOMPLETE.

9. The method of claim 7, wherein the TVM is further associated with a first measurement identity, and a second TVM is associated with a second measurement identity stored in an element block referred to as System Information Block type 11 or 12, the method comprising rejecting the TVM control message when the value is CELL_DCH and the first and second measurement identities are the same.

10. A user equipment (UE) configurable to process a traffic volume measurement (TVM) control message, the UE compliant for use in a Universal Mobile Telecommunications System (UMTS), in which the UE provides for transition between a plurality of states including a CELL_FACH state and a CELL_DCH state, and the TVM is associable with a validity element which has a value that defines the states in which a measurement is valid, comprising:

a control module configured to determine the value of the validity element associable with the TVM; and where the control module is further configured to reject the TVM control message when the UE is in the CELL_FACH state and the determined value is CELL_DCH.

11. The UE of claim 10, wherein the TVM is further associated with a first measurement identity, and a second TVM is associated with a second measurement identity is stored in an element block referred to as System Information Block type 11 or 12, the control module being configured to reject the TVM control message when the UE is in CELL_FACH and the determined value is CELL_DCH and the first and second measurement identities are the same.

* * * * *